United States Patent [19]

Hoshimi et al.

[11] 4,220,879
[45] Sep. 2, 1980

[54] BRUSHLESS DC MOTOR

[75] Inventors: Susumu Hoshimi; Kenzo Nakagawa, both of Yokohama, Japan

[73] Assignee: Sony Corporation, Tokyo, Japan

[21] Appl. No.: 868,048

[22] Filed: Jan. 9, 1978

[30] Foreign Application Priority Data

Jan. 10, 1977 [JP] Japan .................. 52/130877

[51] Int. Cl.² .......................................... H02K 11/00
[52] U.S. Cl. ................................... 310/68 R; 310/268
[58] Field of Search ................. 310/68 R, 68 B, 268, 310/156

[56] References Cited

U.S. PATENT DOCUMENTS

| 3,060,337 | 10/1962 | Henry-Baudot | 310/268 |
| 3,097,319 | 7/1963 | Henry-Baudot | 310/268 X |
| 3,280,353 | 10/1966 | Haydon et al. | 310/268 X |
| 3,867,656 | 2/1975 | Mitsui et al. | 310/68 |
| 4,093,897 | 6/1978 | Fujita et al. | 310/268 X |
| 4,109,170 | 8/1978 | Fujita et al. | 310/268 X |

*Primary Examiner*—Donovan F. Duggan
*Attorney, Agent, or Firm*—Lewis H. Eslinger; Alvin Sinderbrand

[57] ABSTRACT

In a brushless DC motor, the rotor has a rotor shaft with a rotor yoke attached thereto and an annular rotor magnet mounted on the rotor yoke, the stator has a stator yoke with stator coils disposed on the stator yoke so as to face the rotor magnet, and two magnetic field sensing elements, such as, Hall elements, are provided for detecting the rotational position of the rotor. A printed wiring board and the stator coils are arranged on the same surface of the stator yoke so as to make the motor flat. The printed wiring board also serves as a thrust pad for the rotor shaft and provides a ground for the latter.

7 Claims, 5 Drawing Figures

BRUSHLESS DC MOTOR

BACKGROUND OF THE INVENTION

1. Field of the Invention

The present invention relates generally to a brushless DC motor suitable for use in, for example, a record player or a tape player, and more particularly is directed to a brushless DC motor which produces a relatively large yet constant torque, can be made flat and compact, and is capable of being easily and inexpensively manufactured.

2. Description of the Prior Art

A DC motor has been proposed in which two housing shells are assembled together to form a housing for accommodating a stator plate, stator coils, a rotor magnet, and necessary electronic circuit elements. If such a motor is to have room sufficient for all its necessary patts, and for the stator plate to be fixedly positioned so as to operate correctly, miniaturization becomes difficult.

Further, prior art DC motors require a thrust pad made of a specific, relatively expensive alloy. It has also proven to be quite difficult to provide an electrical connection for grounding the rotor shaft in such motors.

OBJECTS AND SUMMARY OF THE INVENTION

It is an object of this invention to provide a brushless DC motor which is free of the drawbacks described above.

It is another object of this invention to provide a brushless DC motor which is flat and compact, has a relatively high yet constant torque, and is easy and inexpensive to manufacture.

It is a further object of this invention to provide a brushless DC motor, as aforesaid, and in which the rotor shaft can be easily connected to ground.

In accordance with an aspect of this invention, a brushless DC motor comprises a rotor which includes a rotor shaft, a rotor yoke mounted thereupon and a rotor magnet mounted on the rotor yoke and having n poles, a stator including a stator yoke and m stator coils disposed on the stator yoke so as to face the rotor magnet in a non-overlapping predetermined angular relation to each other about the axis of the rotor shaft, wiring means connected with the stator coils and being disposed on the stator yoke in non-overlapping relation to the stator coils, and detecting elements, such as Hall effect sensors, mounted on the wiring means for sensing the rotational position of the rotor magnet and providing a corresponding signal by which the current fed to the stator coils can be controlled in accordance with the electrical angle of the rotor magnet.

The above, and further objects, features, and advantages of the invention, will be apparent from the following detailed description of an illustrative embodiment, which is to be read in conjunction with the accompanying drawings.

DETAILED DESCRIPTION OF A PREFERRED EMBODIMENT

Figure 1:
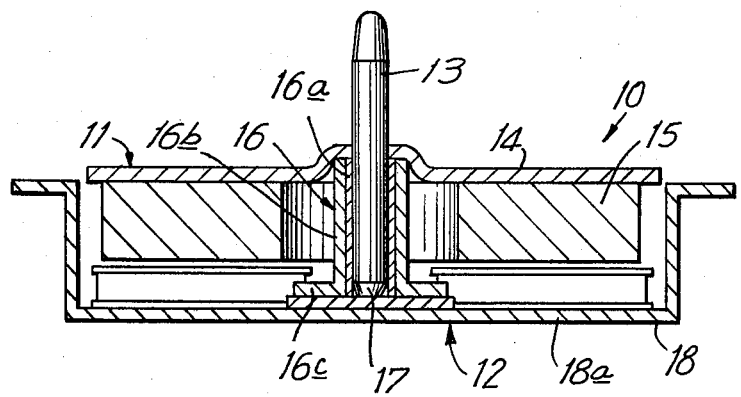
FIG. 1 is an axial sectional view of a brushless DC motor according to this invention.
Figure 3:
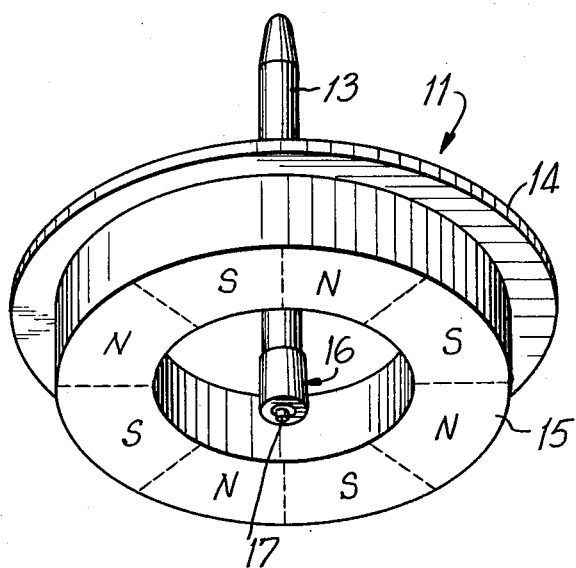
FIG. 3 is a perspective view of a rotor assembly included in the motor of FIG. 1.

Referring to the drawings in detail, and initially to FIG. 1 thereof, it will be seen that a DC motor 10 according to this invention generally comprises a rotor assembly 11 and a stator assembly 12. Rotor assembly 11 includes a rotor shaft 13, a rotor yoke 14 and a rotor magnet 15 (FIG. 3). A portion of rotor shaft 13 that is to be adjacent to the stator assembly resides in a bearing 16 which consists of an inner sleeve 16a, preferably of brass, and an outer housing 16b, preferably of a plastic synthetic resin, and having an end flange 16c for attachment to the stator assembly. The end of rotor shaft 13 adjacent to stator assembly 12 is provided with a ball-bearing 17 inserted by pressure into a socket in the end of shaft 13.

The rotor yoke 14 is shown to be in the form of a disc disposed in a plane perpendicular to the axis of rotor shaft 13 and being attached to the latter. The rotor magnet is suitably secured on rotor yoke 14 at the side of the latter facing toward stator assembly 12. As shown on FIG. 3, rotor magnet 15 is annular and magnetized so as to have eight poles, that is, four north poles alternating with four south poles. The poles of rotor magnet 15 are preferably circumferentially spaced apart with equal angular distances therebetween so that the magnetic flux density of rotor magnet 15 will vary sinusoidally with the rotational angle of rotor assembly 11.

Stator assembly 12 (FIGS. 1 and 2) is shown to include a dished, circular stator yoke 18 on which a plurality of stator coils 19a–19d and a wiring board 20 are mounted. In the preferred embodiment shown on FIG. 2, there are four of the stator coils arranged in pairs at opposite sides of wiring board 12, as at 19a and 19b and at 19c and 19d, respectively, so as to be in non-overlapping relation to each other and to wiring board 20. Further, the stator coils 19a–19d are disposed on stator yoke 18 with predetermined equal angles between the pair of stator coils 19a and 19b and the pair of stator coils 19c and 19d, respectively. The stator coils 19a–19d are wound in single stages on respective winding blocks 21a–21d which are of equal flat shape and axial depth and constructed to occupy equal rotational angles about the axis of rotor shaft 13. The winding blocks 21a–21d can be conveniently molded of a plastic synthetic resin, and may be secured to the circular base plate or wall 18a of stator yoke 18 by screws 22.

Each of stator coils 19a–19d is arranged so as to have generally radially directed edges that are respectively in leading and trailing relation to the direction of rotation of rotor assembly 11, and each of the stator coils is dimensioned so that the angular distance between its leading and trailing edges is equal to $2\pi/n$ (in which n is the number of poles of rotor magnet 15). Thus, in the illustrated example in which rotor magnet 15 has eight poles, the angular distance between the leading and trailing edges of each of stator coils 19a–19d is 45° which corresponds to an electrical angle of 180°, that is, the angle subtended by the arc between consecutive poles of rotor magnet 15. Stator coils 19a–19d are further arranged on stator yoke 18 so that the trailing edges of stator coils 19a and 19c are spaced from the leading edges of stator coils 19b and 19d, respectively, by electrical angles of 90°, and so that the leading edges of the coils 19a and 19b are separated from the leading edges of the coils 19c and 19d, respectively, by electrical angles of 720°, that is, the angles subtended by the arc between four consecutive poles of rotor magnet 15. Stator coils 19a and 19b are connected in series with stator coils 19c and 19d, respectively, and leads 23a, 23b, 23c and 23d extend from coils 19a, 19b, 19c and 19d, respectively, and are connected to a printed circuit (not shown) on wiring board 20.

Figure 2:
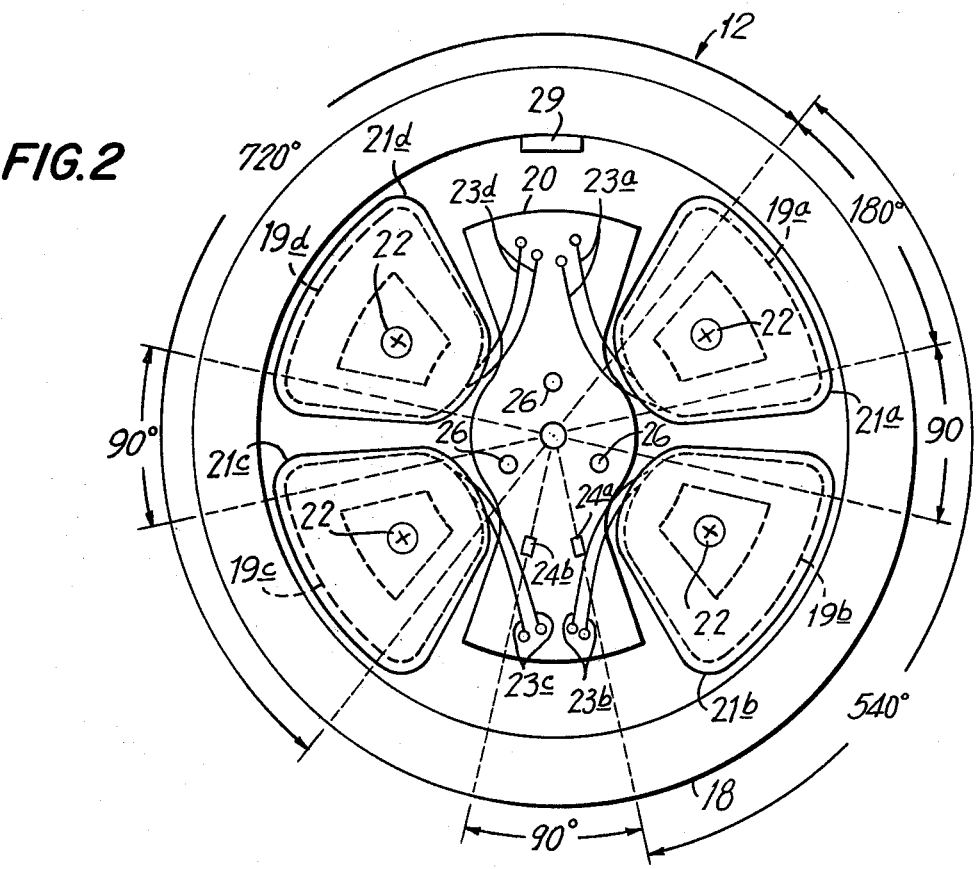
FIG. 2 is a plan view of a stator assembly included in the motor of FIG. 1.

Hall detectors or elements 24a and 24b are mounted on wiring board 20 for sensing the rotational position of rotor magnet 15 and, as shown on FIG. 2, are angularly spaced from each other about the axis of rotor shaft 13 by an electrical angle of 90°. Hall elements 24a and 24b are further arranged so that Hall element 24a is separated from the adjacent or trailing edge of stator coil 19b by an electrical angle of 90°, and further so that Hall element 24b is separated from the leading edge of stator coil 19c by an electrical angle of 90°. Finally, Hall elements 24a and 24b are shown to be angularly spaced from the leading edges of stator coils 19a and 19d, respectively, by integral multiples of an 180° electrical angle. More particularly, Hall element 24a is spaced from the leading edge of coil 19a by an electrical angle of 540°, while Hall element 24b is spaced from the leading edge of coil 19d by an electrical angle of 360°.

Figure 5:
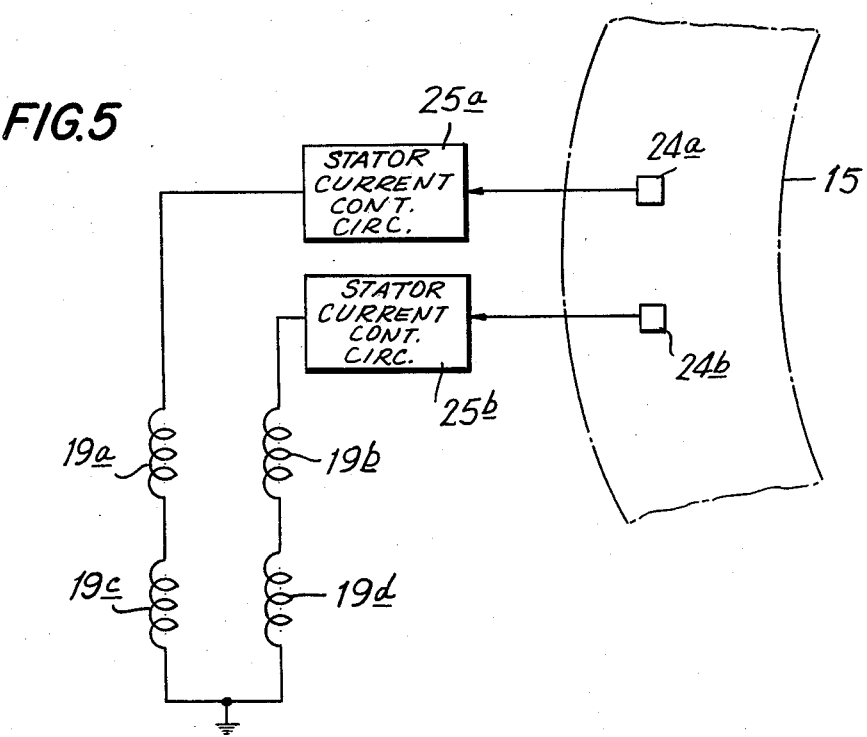
FIG. 5 is a block diagram showing a current control circuit that may be used for supplying current to the stator coils of a motor according to this invention.

As shown schematically on FIG. 5, Hall elements or detectors 24a and 24b respond to the rotational position of rotor magnet 15 to provide corresponding control voltages to suitable control circuits 25a and 25b, by which currents supplied from circuits 25a and 25b to the series connected stator coils 19a and 19c and to the series connected stator coils 19b and 19d, respectively, are regulated or controlled.

Figure 4:
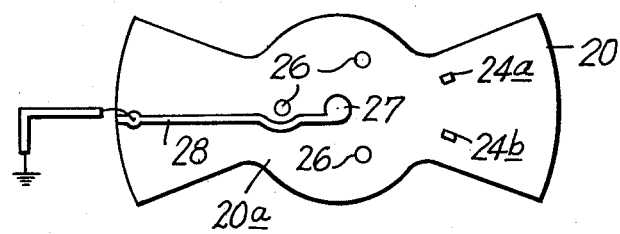
FIG. 4 is a plan view of a wiring board included in the motor of FIG. 1.

Wiring board 20 may be made of a rugged non-conducting material, such as, for example, paper impregnated with epoxy resin, and may be formed with a bow tie configuration, as shown, so as to facilitate the close nesting of stator coils 19a–19d and wiring board 20 on the plane surface of the wall 18a of stator yoke 18 while avoiding overlapping of wiring board 20 and of stator coils 19a–19d. The middle portion 20a of wiring board 20 is shown on FIG. 4 to have a plurality of spaced holes 26, and flange 16c of bearing housing 16b may be formed with similar aligned holes (not shown) through which screws (not shown) may extend for securing bearing 16 and wiring board 20 to stator yoke 18. The wiring board 20 is seen to be perpendicular to the axis of rotor shaft 13 and, at its center, extends adjacent the end of rotor shaft 13 provided with ball bearing 17. Thus, the axial engagement of bearing 17 against the center of wiring board 20 provides a thrust bearing for the axial load on shaft 13.

In order to provide a convenient ground for shaft 13, a layer or pad 27 of copper foil or other conductive material is applied to the center of wiring board 20 (FIG. 4) so as to be engagable by ball bearing 17 of shaft 13, and a printed circuit 28 on board 20 provides a convenient connection from the conductive layer or pad 27 to ground. The printed circuit 28 on wiring board 20 and the previously mentioned printed circuits on the latter for connection to stator coils 19a–19d are preferably arranged so that the connections thereto are all made at one end of wiring board 20 by way of lead wires (not shown) extending through an aperture 29 (FIG. 2) in stator yoke 18. It will be appreciated from the foregoing that wiring board 20 performs the obvious function of providing the necessary connections to the stator coils 19a–19d and the Hall elements 24a and 24b, and also the functions of providing an axial bearing for rotor shaft 13 and connecting the latter to ground by way of printed circuit 28.

The above described motor 10 according to this invention provides a constant torque independent of the rotary position of rotor magnet 15. In other words, when rotor magnet 15 is magnetized so as to provide a magnetic flux density varying sinusoidally with the rotatable angle of the rotor and when stator coils 19a–19d and Hall elements or detectors 24a and 24b are arranged as described above, the currents applied to stator coils 19a–19d cause the magnetic field of stator assembly 12 to interact with the magnetic field of the rotor assembly 11 so as to exert a constant rotational force on rotor magnet 15.

In general, the force due to a magnetic field acting on a current-carrying wire is proportional to the product of the magnetic flux density B and the current i in the wire. Since rotor magnet 15 provides a magnetic flux density that varies sinusoidally with the rotational position of the rotor magnet, and since coils 19a and 19b, or coils 19c and 19d are respectively spaced from each other by half the angular distance between consecutive magnetic poles of rotor magnet 15, that is, by an electrical angle of 90°, the magnetic flux density B₁ acting upon each of coils 19a and 19c and the magnetic flux density B₂ acting on each of coils 19b and 19d can be defined as follows:

$$B_1 = B_0 \sin \theta \qquad (1)$$

$$B_2 = B_0 \cos \theta \qquad (2)$$

where $\theta$ is the electrical angle of rotor 11 and $B_0$ is the maximum value of magnetic flux density from any of the poles of rotor magnet 15. Because Hall elements 24a and 24b are separated from each other by an electrical angle of 90°, the voltages $e_1$ and $e_2$ obtained from Hall elements 24a and 24b, respectively, vary with the rotational position of rotor assembly 11 as follows:

$$e_1 = K_1 \sin \theta \qquad (3)$$

$$e_2 = K_1 \cos \theta \qquad (4)$$

where $K_1$ is a constant. If currents proportional to the voltages obtained from Hall elements 24a and 24b are provided to coils 19a and 19c and to coils 19b and 19d from current control circuits 25a and 25b, respectively, a current $i_1$ flowing through coils 19a and 19c, and a current $i_2$ flowing through coils 19b and 19d may be derived from equations (3) and (4) as follows:

$$i_1 = K_2 \sin \theta \qquad (5)$$

$$i_2 = K_2 \cos \theta \qquad (6)$$

where $K_2$ is a constant. Assuming that the force acting on coils 19a and 19c is $F_1$, and that the force acting on coils 19b and 19d is $F_2$, and since the force acting on each stator coil is proportional to the product of the magnetic flux density applied to the respective coil and the current flowing therethrough, the forces $F_1$ and $F_2$ can be expressed as follows:

$$F_1 = i_1 B_1 = K_2 B_0 \sin^2 \theta \tag{7}$$

$$F_2 = i_2 B_2 = K_2 B_0 \cos^2 \theta \tag{8}$$

Accordingly, a rotational force F acting on the rotor assembly 11 is the sum of the component forces, to wit, $$\begin{aligned} F = F_1 + F_2 &= K_2 B_0 \sin^2\theta + K_2 B_0 \cos^2\theta \\ &= K_2 B_0 (\sin^2\theta + \cos^2\theta) \\ &= K_2 B_0 \end{aligned} \tag{9}$$

Thus, equation (9) reveals that the rotational force F applied to rotor assembly 11 is a constant independent of the electrical angle $\theta$, and hence independent of the rotary angle, of rotor assembly 11.

Therefore, the DC motor according to this invention provides a smooth rotation, free from the fluctuations in torque that cause wow and flutter which are particular sources of trouble in record players, tape players, or other audio equipment. Further, in the described DC motor, the current flowing through each stator coil is not switched or changed-over, as in the prior art, so that there is no noise or mechanical sound associated with the supplying of current to stator coils 19a–19d.

Since the number of stator coils 19a–19d is small as compared with the number of magnetic poles on rotor magnet 15, it is possible to arrange the stator coils in non-overlapping relation to each other. Also, the stack of windings for each stator coil can be made in a single stage. Therefore, the axial distance between rotor magnet 15 and stator yoke 18, and hence the thickness of the motor, can be reduced. This reduction in axial dimension results in an increased density of magnetic flux despite a smaller number of stator coils, and, therefore, the motor according to this invention provides a torque equivalent to, or higher than that provided by a motor having a relatively larger number of stator coils arranged in overlapping relation to each other and being formed in winding stacks of several stages.

Moreover, because the stator winding blocks 21a–21d are arranged on stator yoke 18 in non-overlapping relation to each other and to wiring board 20, the axial distance between rotor magnet 15 and stator yoke 18 can be further reduced by the thickness of wiring board 20. Thus, this invention provides a motor that is relatively flatter than prior art motors in which winding blocks for stator coils are disposed on a wiring board. The density of the magnetic flux, and hence the torque, are further increased by this reduction in axial distance between rotor magnet 15 and stator yoke 18.

Further, since each stator coil consists of winding stacks in one stage, and the axial dimensions for the four stator winding blocks 21a–21d are equal, the gap between rotor magnet 15 and the winding blocks 21a–21d can be easily and precisely determined, thereby simplifying assembly.

In the illustrated embodiment, the winding of stator coils 19a–19d on winding blocks 21a–21d, respectively, which are simply attached to stator yoke 18 by screws 22 is to be contrasted with a typical prior art brushless DC motor, in which the coils are wound directly on the stator yoke and/or other fixed members. By winding the stator coils 19a–19d on individual winding blocks 21a–21d which are simply attached by screws 22 to stator yoke 18, the precise positioning of the stator coils can be achieved economically and without difficulty.

In the illustrated embodiment of the invention, rotor assembly 11 has its rotor magnet 15 provided with eight poles and stator assembly 12 has four stator coils 19a–19d with alternate stator coils being connected in series to each other. The invention is not, however, limited to the foregoing arrangement. For instance, a motor according to this invention can be provided having a two-pole rotor magnet, and a stator having two stator coils separated from each other by an electrical angle of 90°, with the stator coils being in non-overlapping relation to each other. Even when the rotor magnet has a greater number of poles, for example, more than eight, the number of stator coils can be selected so that the stator coils do not overlap each other, and such coils are arranged so that those not connected in series with each other are separated from each other by an odd multiple of an electrical angle of 90°.

It is also possible in connecting rotor shaft 13 to ground, to electrically connect the thrust pad 27 of wiring board 20 to stator yoke 18 so that the stator yoke is also grounded.

Although a particular embodiment of the invention has been described in detail herein with reference to the accompanying drawings, it is to be understood that the invention is not limited to that precise embodiment and that various changes and modifications may be effected therein by a person skilled in the art without departing from the scope or spirit of the invention as defined in the appended claims.

We claim:

1. A brushless D.C. motor comprising:
   a rotor including a rotor shaft, a rotor yoke mounted on said rotor shaft, and a rotor magnet mounted on said rotor yoke and having n poles, n being an even positive integer;
   a stator including a stator yoke and m stator coils disposed on said stator yoke so as to face said magnet in a non-overlapping predetermined angular relationship to each other about the axis of said rotor shaft, m being a positive integer, said rotor yoke and said stator yoke being closely adjacent to each other at their edges to define a relatively flat housing which contains said rotor magnet and which forms a magnetic circuit;
   wiring means connected with said stator coils and being disposed on said stator yoke between said stator coils so as to be in non-overlapping relation to the latter;
   detecting means for detecting the rotated angular position of the rotor and from which the current fed to the stator coils can be controlled;
   said wiring means including a printed circuit board disposed in a plane perpendicular to said axis of the rotor shaft and extending adjacent the end of the rotor shaft disposed nearest to said stator yoke; an said printed circuit board having a portion abutting said end of the rotor shaft disposed next to the stator yoke and serving as a thrust pad for said shaft relative to the stator.

2. A brushless D.C. motor according to claim 1; in which m is less than n.

3. A brushless D.C. motor according to claim 1; wherein said stator coils have respective axes arranged parallel to the axis of the rotor shaft and being angularly separated from each other about the axis of the rotor shaft by an angle equal to $l\pi/n$, in which l is an odd integer.

4. A brushless D.C. motor according to claim 1; wherein said portion of the circuit board abutting said end of the rotor shaft nearest the stator yoke is clad with a conducting material connected to a common ground for grounding the rotor shaft thereby.

5. A brushless D.C. motor according to claim 1; therein said printed circuit board is constructed of paper impregnated with epoxy resin.

6. A brushless D.C. motor according to claim 1; wherein said detecting means includes at least a pair of Hall detectors disposed on said wiring means so as to be separated from each other about the axis of the rotor shaft by an angle of $l\pi/n$, in which l is an odd integer.

7. A brushless D.C. motor comprising:

a rotor including a rotor shaft, a rotor yoke mounted on said rotor shaft, and an annular rotor magnet mounted on said rotor yoke and having 8 consecutive poles spaced apart by approximately equal distances along its circumference, thereby providing a sinusoidal pattern of flux density with respect to the angular position of the rotor magnet;

a stator including a stator yoke and 4 stator coils disposed on said stator yoke so as to face said magnet in a non-overlapping predetermined angular relationship to each other about the axis of said rotor shaft, said rotor yoke and said stator yoke being closely adjacent to each other at their edges to define a relatively flat housing which contains said rotor magnet and which forms a magnetic circuit;

wiring means connected with said stator coils and being disposed on said stator yoke between said stator coils so as to be in non-overlapping relation to the latter;

detecting means for detecting the rotated angular position of the rotor and from which the current fed to the stator coils can be controlled; and said stator coils including first and second pairs of stator coils arranged with the axis of each coil parallel to said axis of the rotor shaft and with each coil having edges that are in leading and trailing relation with respect to the direction of rotation of the rotor, each stator coil being dimensioned so that an angular distance about said axis of the rotor shaft between the respective leading and trailing edges equals the angular distance between said consecutive poles of the rotor magnet, said first and second pairs of stator coils being disposed at opposite sides of said wiring means, and the leading edge of one, and the trailing edge of the other of the coils of each said pair of stator coils being angularly separated about said axis of the rotor shaft by an angular distance equal to one-half the angular distance between said consecutive poles of the rotor magnet, and said detecting means including a pair of Hall detectors mounted on said wiring means and disposed about said axis of the rotor shaft so that the angular distance between said detectors equals one-half the angular distance between said consecutive poles of the rotor magnet, and the angular distance between each said detector and the nearest edge thereto of any of said stator coils equals one-half said angular distance between the consecutive poles of the rotor magnet.

* * * * *